United States Patent
Bostick et al.

(10) Patent No.: US 10,325,385 B2
(45) Date of Patent: Jun. 18, 2019

(54) COMPARATIVE VISUALIZATION OF NUMERICAL INFORMATION

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 14/864,799

(22) Filed: Sep. 24, 2015

(65) Prior Publication Data

US 2017/0091902 A1    Mar. 30, 2017

(51) Int. Cl.
| | | |
|---|---|---|
| G06T 3/40 | (2006.01) | |
| G06T 11/20 | (2006.01) | |
| G06F 17/27 | (2006.01) | |
| G06F 3/0481 | (2013.01) | |
| G06F 17/24 | (2006.01) | |

(52) U.S. Cl.
CPC ........ *G06T 11/206* (2013.01); *G06F 17/2765* (2013.01); *G06T 3/40* (2013.01); *G06F 3/04815* (2013.01); *G06F 17/246* (2013.01)

(58) Field of Classification Search
CPC . G06T 3/40; G06F 17/30994; G06F 3/04815; G06F 17/246; G06Q 30/0241
See application file for complete search history.

(56) References Cited

U.S. PATENT DOCUMENTS

| | | | |
|---|---|---|---|
| 7,643,029 B2 | 1/2010 | Hao et al. | |
| 8,275,747 B2 | 9/2012 | Tuchman et al. | |
| 8,756,229 B2 | 6/2014 | Stockton et al. | |
| 9,195,370 B1* | 11/2015 | Hlatky, Jr. | ............ G06F 3/0482 |
| 2003/0212527 A1* | 11/2003 | Moore | .................. G06F 9/4448 |
| | | | 702/179 |
| 2006/0232800 A1* | 10/2006 | Otake | ................ H04N 1/40062 |
| | | | 358/1.9 |

(Continued)

OTHER PUBLICATIONS

Infosthetics, "Social Compare: Visually Compare the Size of Objects and Concepts", Mar. 3, 2011, http://infosthetics.com/archives/2011/03/social_compare_share_and_compare_the_sizes_of_objects.html.*

(Continued)

*Primary Examiner* — Saptarshi Mazumder
(74) *Attorney, Agent, or Firm* — Garg Law Firm, PLLC; Christopher K. McLane

(57) ABSTRACT

For visualizing numerical information, a content is analyzed to identify the numerical information. From the content, a contextual information that is descriptive of the numerical information is selected. A graphical shape is selected to represent the numerical information. A dimension of the graphical shape is adjusted such that the adjusted dimension represents a value in the numerical information according to a scale. A comparison object is selected where a size associated with the comparison object is a fraction of the adjusted dimension according to a ratio. The comparison object is presented relative to the graphical shape as a visualization of the numerical information.

20 Claims, 6 Drawing Sheets

(56) References Cited

U.S. PATENT DOCUMENTS

| | | | |
|---|---|---|---|
| 2006/0288284 A1* | 12/2006 | Peters .................. | G06F 3/04815 715/700 |
| 2012/0053986 A1 | 3/2012 | Cardno et al. | |
| 2013/0232157 A1 | 9/2013 | Kamel | |
| 2014/0057657 A1* | 2/2014 | Manber .............. | G01C 21/3644 455/456.3 |
| 2016/0292507 A1* | 10/2016 | Ghoson ............. | G06F 17/30241 |

OTHER PUBLICATIONS

Anonymously; Comparative Information based Video and Image Object Search, Mar. 16, 2015.

IBM et al.; Mapping Constructs for Control of Constant Data appearing on Imaged Pages, Jan. 27, 2005.

* cited by examiner

COMPARATIVE VISUALIZATION OF NUMERICAL INFORMATION

TECHNICAL FIELD

The present invention relates generally to a method, system, and computer program product for data analysis and comprehension. More particularly, the present invention relates to a method, system, and computer program product for comparative visualization of numerical information.

BACKGROUND

Quite frequently, the content being viewed by a user includes numerical information. For example, a news article may include numerical information such as a volume of oil spilled in an oil-spill accident, e.g., estimated 250,000 to 750,000 barrels of crude spilled during the Exxon Valdez accident. As another example, a study may include numerical information, e.g., 8 million metric tons of plastic waste dumped into the ocean every year.

SUMMARY

The illustrative embodiments provide a method, system, and computer program product for comparative visualization of numerical information. An embodiment includes a method for visualizing numerical information. The embodiment analyzes, using a processor and a memory, a content to identify the numerical information. The embodiment selects, from the content, a contextual information that is descriptive of the numerical information. The embodiment selects a graphical shape to represent the numerical information. The embodiment adjusts a dimension of the graphical shape such that the adjusted dimension represents a value in the numerical information according to a scale. The embodiment selects a comparison object, wherein a size associated with the comparison object is a fraction of the adjusted dimension according to a ratio. The embodiment presents, as a visualization of the numerical information, the comparison object relative to the graphical shape.

Another embodiment includes a computer program product for visualizing numerical information, the computer program product comprising one or more computer-readable storage devices, and program instructions stored on at least one of the one or more storage devices.

Another embodiment includes a computer system for visualizing numerical information, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
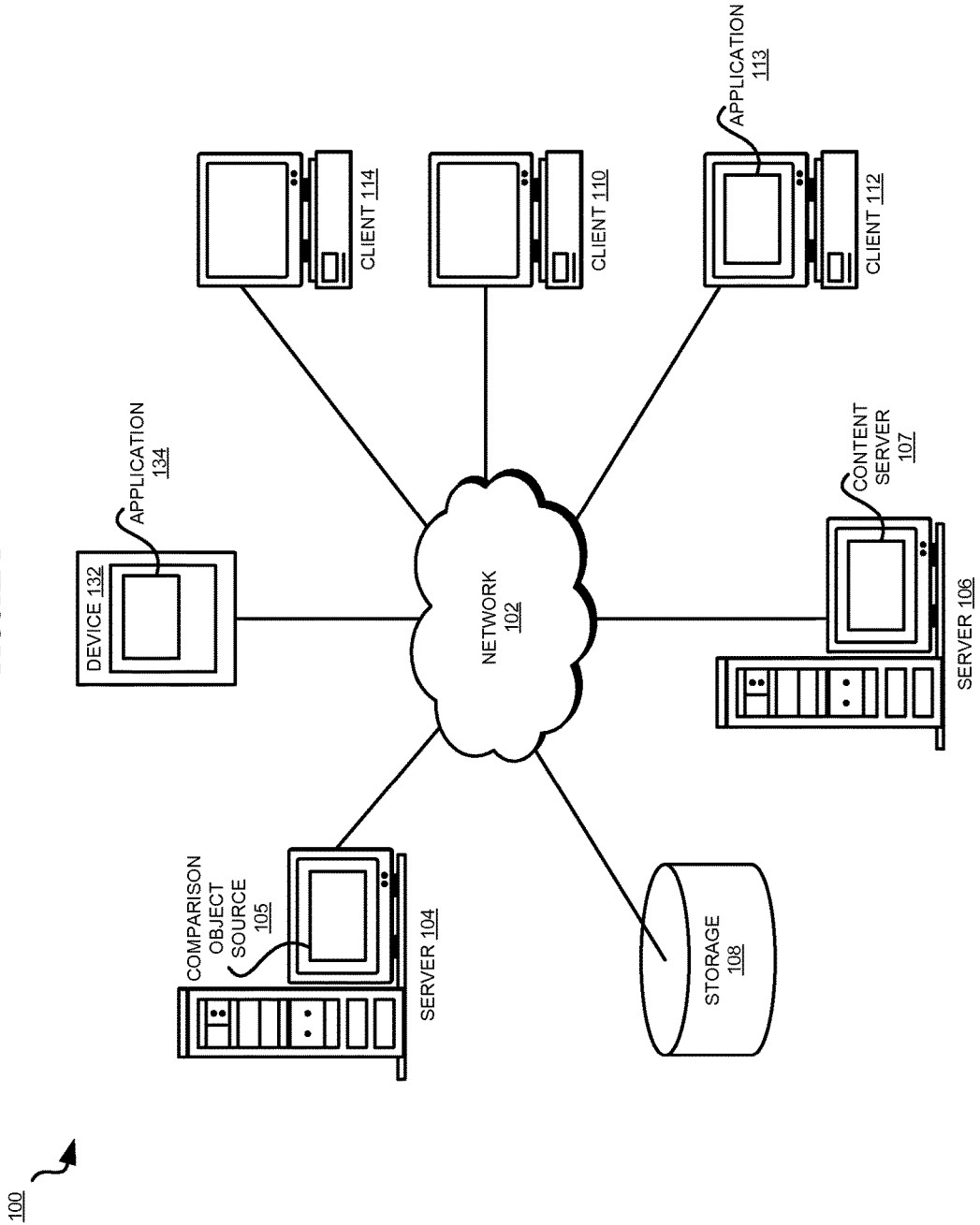
FIG. 1 depicts a block diagram of a network of data processing systems in which illustrative embodiments may be implemented.

The illustrative embodiments recognize that while most users understand the numeric values of the numbers in such information, it is often difficult for the users to comprehend the size of the thing associated with such numeric information. For example, most users will understand that 8 million metric tons means "8" followed by six zeros tons—which is a large number, but will have difficulty comprehending how large a pile eight million metric tons of plastic makes. Such visualization would be useful in delivering the full impact of the numerical information to the user. For example, such visualization would be useful to a user in understanding the impact of eight million metric tons of plastic waste, e.g., whether that much plastic waste is inconsequential given the size of an ocean or is sizeable enough to pose serious harm to a geographical area.

As another example, suppose a news article describes that 350,000 liters of oil has been spilled in a river. Even if a user is good at visualizing sizes, the user may be unaccustomed to the metric system of measurements, and where visualizing a US gallon is easy, visualizing a liter, or 350,000 liters, may not be so easy for such a user.

As another example, even if the user is able to visualize certain quantities or numerical information, the user may want to gain a better understanding of the numerical information from a particular point of view. For example, the illustrative embodiments recognize that if the news article provides that 350,000 liters of oil have been spilled, the user may be interested in knowing how large a film that much oil would create. It is difficult for most human users to visualize a size of a film of a certain thickness that is formed by 350,000 liters of oil, more so for a user who is not conversant in the metric system.

The illustrative embodiments recognize that the type of item associated with the numerical information also plays a role in the difficulty in comprehending the physical size of the described item. For example, if some content only says 1 million cubic feet of gas, most users will find it difficult to comprehend how large a gas volume that might be. Or, if some text describes a lake having 50 million gallons of liquid water, it is difficult to comprehend how large an area the lake would occupy for a certain depth. Similarly, users will have difficulty comprehending whether a ton of solid gold in Fort Knox looks about the same size or different than a car of similar weight.

Thus, the illustrative embodiments recognize that the comprehension of numerical information is greatly aided by visualization of the numerical information relative to a comparison object. The illustrative embodiments recognize that presently available tools or methods do not assist the user by providing such a manner of comprehending numerical information.

The illustrative embodiments used to describe the invention generally address and solve the above-described problems and other problems related to comprehending numerical information. The illustrative embodiments provide a method, system, and computer program product for comparative visualization of numerical information.

An embodiment executes as an application in, or in conjunction with, a data processing system used by a user for viewing textual or visual content. For example, an embodiment can be implemented as a modification of an existing browser application such that the modified browser application operates in a manner described herein. Another example embodiment can be adapted to integrate with an application that is used to view content having numerical information, to operate in a manner described herein.

An embodiment analyzes the content that includes one or more instances of same or different numerical information. For example, a news article may include several instances of numerical information, such as, a serial number, a publication number, a capacity of a ship in number of gallons, an oil output of an oil well or terminal from where the ship loads, an estimated number of barrels of oil shipped through a shipping channel each year, an amount of oil spilled in an accident, a phone number, and many other pieces of numerical information.

As can be seen from the above non-limiting examples, not all numerical information in the content needs to be visualized. In other words, visualization of certain instances of numerical information is more useful in comprehending the content as compared to other numerical information. For example, visualizing the amount of oil spilled in the accident is more meaningful to the user than visualizing the publication number or the phone number or even the estimated number of barrels of oil shipped through the shipping channel each year.

An embodiment selects certain instances of numerical information for visualization. One example embodiment identifies a topic of the content, and determines by using Natural Language Processing (NLP) techniques, whether a particular instance of the numerical information is related to the topic. If a numerical information is related to the topic, the embodiment selects the numerical information for visualization. Another example embodiment selects an instance of numerical information for visualization by determining whether the numerical information exceeds a certain value threshold, matches a user preference, has a relevance (according to NLP) to the topic, and other factors. The factors used for selecting an instance of numerical information for visualization can be found in a portion of the content that surrounds the numerical information, a portion that is removed from the numerical information by one or more words, phrases, lines, or even paragraphs, and generally by a distance up to some distance threshold. The factors used for selecting an instance of numerical information for visualization can also be user-specified, such as in a preference configuration.

For a selected numerical information, the embodiment further determines a context in which the numerical information is provided in the content. A context of a numerical information is a part of the content, or a meaning of a part of the content, which provides an intended interpretation of the numerical information. For example, the numerical information may be 350,000. Without a context, the numerical information is simply a number without any specific meaning. As one example, if a unit of measure is found associated with the numerical information in the content, the unit of measure provides context to the numerical information. For example, suppose that instead of just "350,000", the content states "350,000 liters". The analysis of the embodiment determines that the unit of measure—liters— is used for measuring liquids, so the context in which the numerical information is used is to measure a liquid in metric system using liters as units. So, according to the analysis of the embodiment, the context of the numerical information "350,000" is a volume of a liquid.

Now suppose that the content provides not just "350,000 liters", but "350,000 liters of furnace oil". The analysis of the embodiment determines that the unit of measure— liters— is used for measuring liquids, so the context in which the numerical information is used is to measure a liquid in metric system using liters as units, and further that the liquid being measured is furnace oil. Now, according to the analysis of the embodiment, the context of the numerical information "350,000" is a volume of furnace oil.

From this disclosure, those of ordinary skill in the art will be able to adapt an existing NLP tool or technique to perform the analysis of the content, the identification of numerical information, the selection of numerical information instances to visualize, and the context extraction. Such adaptations are contemplated within the scope of the illustrative embodiments.

An embodiment further selects a shape, object, or area to use for visualizing a selected instance of numerical information with its corresponding context. For example, a shape can be a geometric or a non-geometric two-dimensional (2D) or three-dimensional (3D) shape. Some non-limiting examples of 3D geometric shapes include a cube, a cuboid, a sphere, and a prism. Some non-limiting examples of 3D non-geometric shapes include an office building, a tree, a mountain, an automobile, and the International space Station. Some non-limiting examples of 2D geometric shapes include a square, a rectangle, a rhombus, a circle, and an ellipse. Some non-limiting examples of 2D non-geometric shapes include a map of a geographical area, an outline of a water body, and a layout of an automotive racetrack.

Each of these example shapes and other similarly configured shapes are usable by an embodiment for visualizing a numerical information. An embodiment sizes a selected shape in proportion to the numerical information that has to be visualized. For example, if the embodiment selects a cube to represent 350,000 liters of oil, the embodiment computes that a cube with each side measuring 70.47 millimeters (mm) would approximate a proportion of 1 cubic mm per liter. As another example, if the embodiment selects a map to represent 350,000 liters of oil, the embodiment computes that an area of 175 square kilometers (km)—outlined on the map in any suitable manner—would be 2 mm deep in oil. Then, using the map's proportions, e.g., 1 centimeter (cm) representing 1 kilometer, the embodiment outlines a proportional area on the map that represents 175 square km.

Having selected a proportioned shape to visualize the numerical information, an embodiment further selects a comparison object. The comparison object is another shape, object, or area whose shape and size are expected to be known to the user. For example, many users can easily conjure up a mental image of a modern windmill, if the windmill were selected as a comparison object. A user is expected to know that a windmill stands approximately eighty feet tall and the blades span can reach one hundred feet.

An embodiment renders the selected shape according to the selected proportions and the selected comparison object according to another selected proportions. Particularly, the embodiment renders the proportioned shape and the proportioned comparison object relative to one another, such as, but not limited to, the two renderings being adjacent to one another, one overlaid on another, and other such configurations. Such manner of rendering enables the user to compare a visualized shape representing the numerical information with a known size of the comparison object, and comprehend the impact of the numerical information in the content.

For example, suppose that a cube shape is selected by an embodiment to visualize a numerical information, and a windmill is selected as a comparison object. Further suppose that a side of that proportioned cube approximates the height of the comparably proportioned windmill (e.g., 1 mm equals 1 foot of height). When the proportioned cube is rendered relative to a proportioned image of the windmill, e.g., the cube enclosing the windmill, a user can now comprehend that the 350,000 liters of oil would completely sink a windmill in a cube of oil the size of the windmill on all sides.

In one embodiment, the comparison object is selected based on the user's locale or location. A user's locale is a setting or preference whereby the user or user's device is configured according to the language and geographical settings of a geographical region. A user's location is a physical location, which is described by geo-location coordinates where the user or the user's device is physically situated at a given time.

For example, a user whose locale is set in France is likely to be familiar with structures and other comparison objects in France, e.g., the shape and the size of the Eiffel tower. Similarly, a user whose locale is set in New York is likely to be familiar with structures and other comparison objects in New York, e.g., the shape and the size of the Empire State building. Similarly, a user whose location is in front of the Sydney Opera House can easily determine the shape and size of the that comparison object by actually perceiving it, such as through augmented reality glasses, or a wearable or mobile device.

Selections of locale or location dependent comparison objects enables the user to better comprehend the numerical information by being able to associate the size of the numerical information with a familiar object from the user's locale or location. Alternatively, a user can pre-configure a comparison object repository with comparison objects of the user's choice. An embodiment selects a comparison object from such a repository whenever possible for a similar purpose.

Furthermore, a user can also pre-configure other options. One such option can be a choice of ratios or proportions to use in the visualization. For example, a user may not want an approximately 1:1 ratio between a dimension of a proportioned visualization shape and a dimension of a proportioned comparison object. For example, a user can configure the option such that an embodiment selects a different ratio, e.g., 1:10 or 1:100 between a dimension of a proportioned visualization shape and a dimension of a proportioned comparison object.

For example, while the shape to windmill dimension ratio might be 1:1 in an above-described example, the ratio of the shape to a human figure dimension (1 mm equals 1 foot) might be 1:15, the ratio of the shape to a single storey building (1 mm equals 1 foot) might be 1:8, and the ratio of the shape to a one hundred storey building (1 mm equals 1 foot) might be 1:0.08, and so on.

One embodiment further allows a user to change the visualization. For example, suppose that the embodiment selects a cube and a windmill to render the visualization of 350,000 liters of oil. The embodiment further presents an input method, such as a text input box, together with the visualization. The user can enter a natural language input in the input method.

The embodiment analyzes the natural language input method, e.g., using NLP, to determine the user's change instruction in the input. For example, one example change instruction might be to use a different ratio between the visualization shape and the comparison object. An embodiment may select a different comparison object as a result of such an instruction. Another example change instruction might be to use a different visualization shape. An embodiment may select a different shape, e.g., a sphere as a result of such an instruction. Another embodiment might also change the comparison object corresponding to the sphere, such as by not only replacing the cube with the sphere but also replacing the windmill with a basketball. Another example change instruction might be to use a different comparison object. An embodiment may select a different comparison object as a result of such an instruction.

These examples of the change instructions are not intended to be limiting. From this disclosure, those of ordinary skill in the art will be able to conceive many other instructions and their corresponding changes using an embodiment and the same are contemplated within the scope of the illustrative embodiments.

A method of an embodiment described herein, when implemented to execute on a device or data processing system, comprises substantial advancement of the functionality of that device or data processing system in effectively communicating numerical information. For example, prior-art method of visualizing numbers is rudimentary at best, using static images of a select few unrelated numbers with a fixed, pre-selected, and uncustomizable comparison object. An embodiment provides a method for analyzing a given content, selectively extracting certain numerical information and their corresponding context from the content, visualizing the numerical information in a customizable manner, comparing the visualized 2D or 3D shape with customizable comparison objects, and allowing a user to change the visualization. Such a manner of visualizing numerical information is unavailable in presently available devices or data processing systems. Thus, a substantial advancement of such devices or data processing systems by executing a method of an embodiment is in improving the comprehension of numerical information for the user and enabling the numerical portions of the content to become related to the user's personal experiences for greater impact than the prior art.

The illustrative embodiments are described with respect to certain content, numerical information, portions and locations of portions of content, contexts, shapes, areas, dimensions, proportions, ratios, comparison objects, customizations, input methods, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
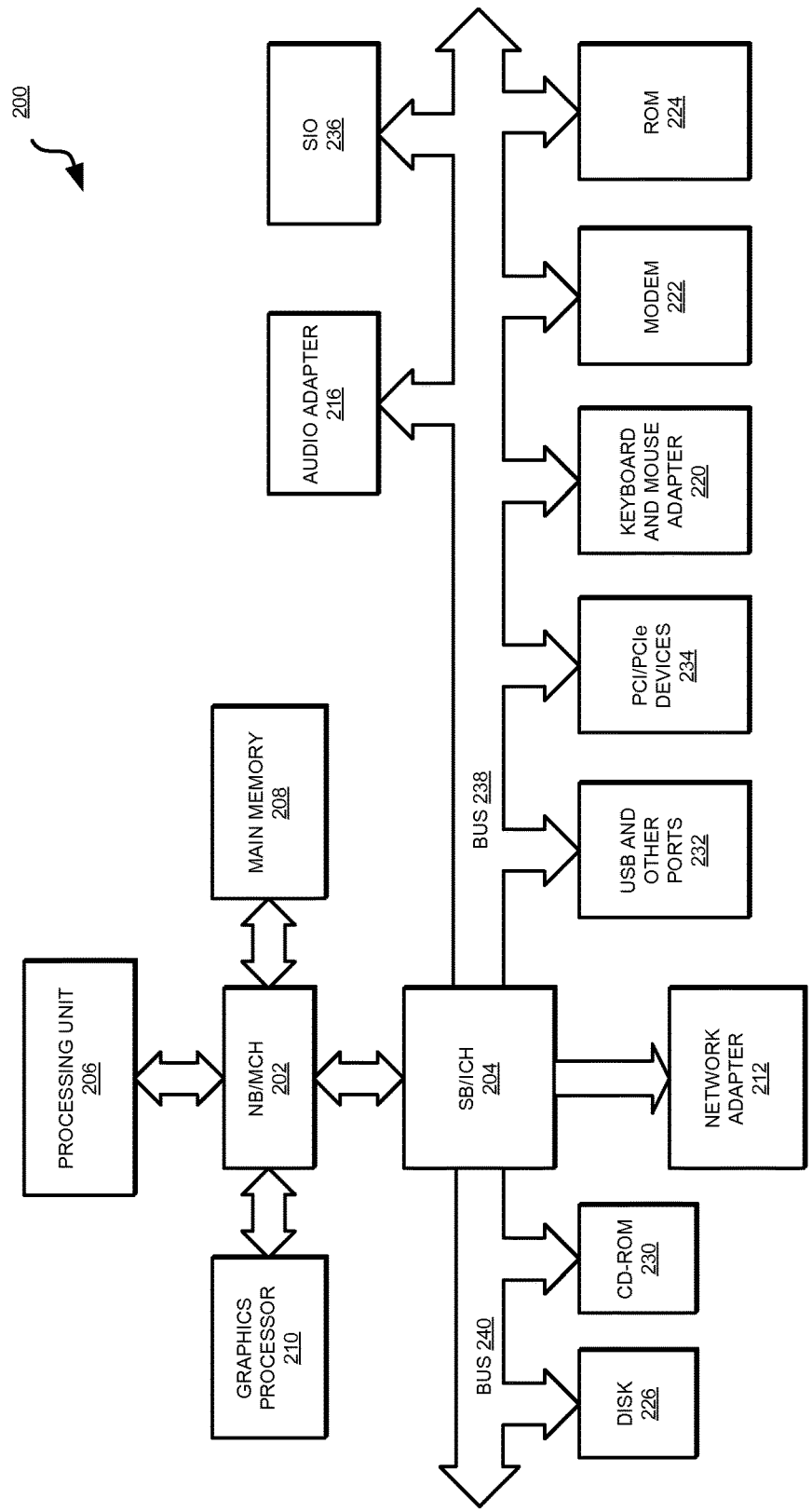
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 134 implements an embodiment described herein in device 132. For example, application 134 analyzes content received from content server 107, extracts a numerical information and the associated contextual information from such content, and visualizes the numerical information in a manner described herein. For comparison of the visualization shape, application 134 uses a comparison object stored in device 132 or in a repository accessible to device 132, or uses a comparison object from comparison object source 105 over network 102. Application 113 operates in client 112 in a manner similar to the operations of application 134 in device 132.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 and 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
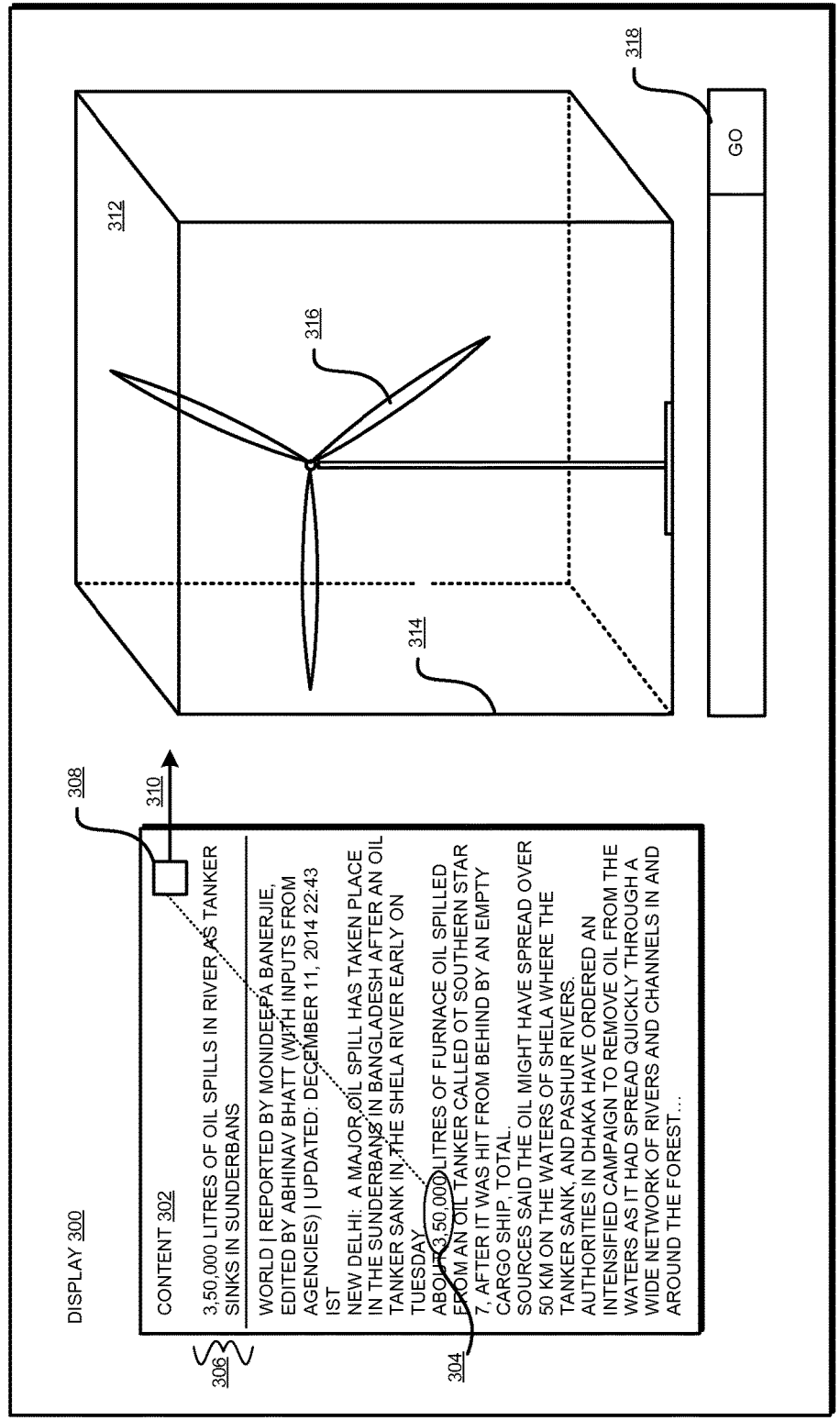
FIG. 3 depicts a block diagram of an example presentation of comparative visualization of numerical information in accordance with an illustrative embodiment.

With reference to FIG. 3, this figure depicts a block diagram of an example presentation of comparative visualization of numerical information in accordance with an illustrative embodiment. Display 300 is a visual interface component of device 132 or client 112 in FIG. 1, and is usable for visually presenting textual and graphical information to a user. Content 302 is an example content provided by content server 107 in FIG. 1.

An application, such as application 113 or 134 in FIG. 1, analyzes content 302. The application (not shown) determines that numerical information 304 should be selected for visualization. As a non-limiting example, the application selects numerical information 304 because of numerical information's relation to topic 306 of content 302. As described elsewhere in this disclosure, the selection of numerical information, such as numerical information 304 can be performed automatically or manually for other reasons and in other manners as well. For example, in one embodiment, the user can manually select numerical information 304 for visualization.

According to one embodiment, the application creates a visual indication relative to content 302 that numerical information 304 has been selected for visualization. Indication 308 is depicted in this figure as an icon or thumbnail image placed relative to content 302, such as in an empty space in content 302 or display 300. Furthermore, indication 308 is visibly associated with numerical information 304 in any suitable manner so that the user becomes aware that indicator 308 is for visualization of numerical information 304.

When the user interacts (310) with indication 308, the application presents the visualization of numerical information 304. The visualization comprises selected shape 312. A dimension of shape 312, such as side 314 is proportionate to a value of numerical information 304 such that the dimension is representative of the value of numerical information 304 in some scale.

The visualization further comprises comparison object 316. Comparison object 316 is selected and sized according to a ratio in a manner described herein.

Optionally, the visualization can also include input method 318. In the depicted example, input method 318 is a text input box, using which the user can input change instructions as described herein. The change instruction can not only be used to change the visualization or an aspect thereof, but can also be used to select another numerical information, different from numerical information 304, in content 302.

Figure 4:
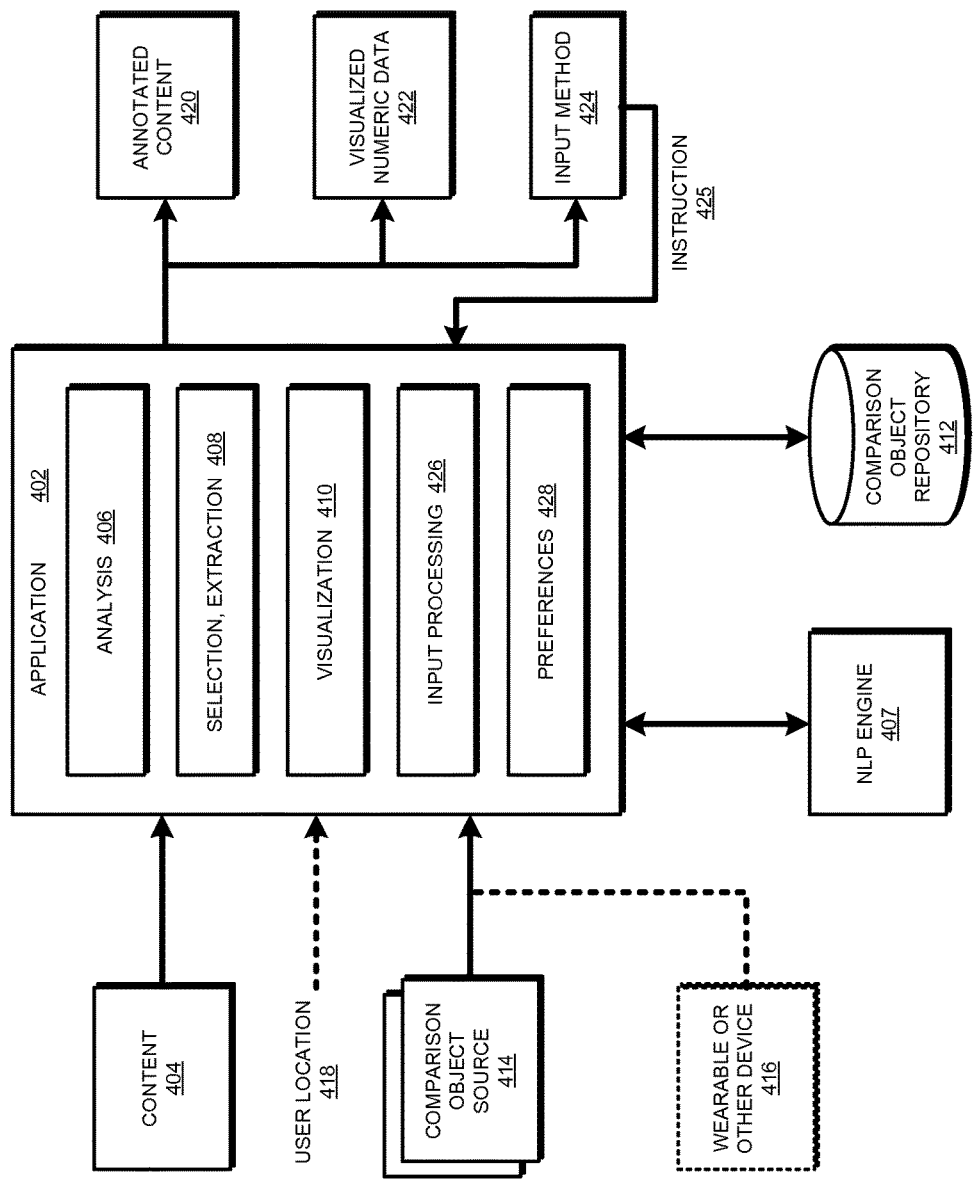
FIG. 4 depicts a block diagram of an example configuration for comparative visualization of numerical information in accordance with an illustrative embodiment

With reference to FIG. 4, this figure depicts a block diagram of an example configuration for comparative visualization of numerical information in accordance with an illustrative embodiment. Application 402 is an example of application 134 or 113 in FIG. 1. Content 404 is an example of content 302 in FIG. 3.

Application 402 receives as input content 404. Component 406 analyzes the content, such as by using NLP engine 407, to identify instances of numerical information that are present therein. Component 408 selects an instance of numerical information from content 404 according to the result of the analysis by component 406. Component 408 also extracts contextual information for the selected numerical information.

Component 410 selects a shape to visualize the selected numerical information. Component 410 also selects a comparison object. The selected comparison object can be obtained from repository 412, source 414, or device 416. For example, device 416 may be able to view a comparison object at a location of the user, and provide that comparison object as input to application 402 for use by component 410.

Optionally, component 410 can use location 418 of the user to select a comparison object that is geographically relevant to the present location of the user. Optionally, and for a similar purpose, component 410 can use locale information (not shown) from the device where application 402 is executing.

Component 410 produces and presents annotated content 420 on a visual display, such as display 300 in FIG. 3. Annotated content 420 includes a visual indication, such as indication 308, which is visually linked or correlated with the selected numerical information in any suitable manner. Component 410 further produces and presents visualization 422 on the display, which visualizes the selected numerical information comparatively with the selected comparison object.

Optionally, component 410 produces input method 424. If the user provides change instruction 425 in input method 424, component 426 processes instruction 425, such as by using NLP engine 407. Components 406, 408, and 410, or some combination thereof can be re-executed according to instruction 425.

Component 428 manages a set of preferences of the user. For example, component 428 allows the user to add, remove, or manipulate comparison objects in repository 412. As another example, using component 428, the user can specify whether to use location 418 or the locale settings in comparison object selection. As another example, using component 428, the user can specify whether to use device 416 for comparison object input in comparison object selection. As another example, using component 428, the user can specify certain ratios to use or avoid in generating visualization 422.

These examples of user preferences are not intended to be limiting. From this disclosure, those of ordinary skill in the art will be able to conceive many other preference settings and the same are contemplated within the scope of the illustrative embodiments.

Figure 5:
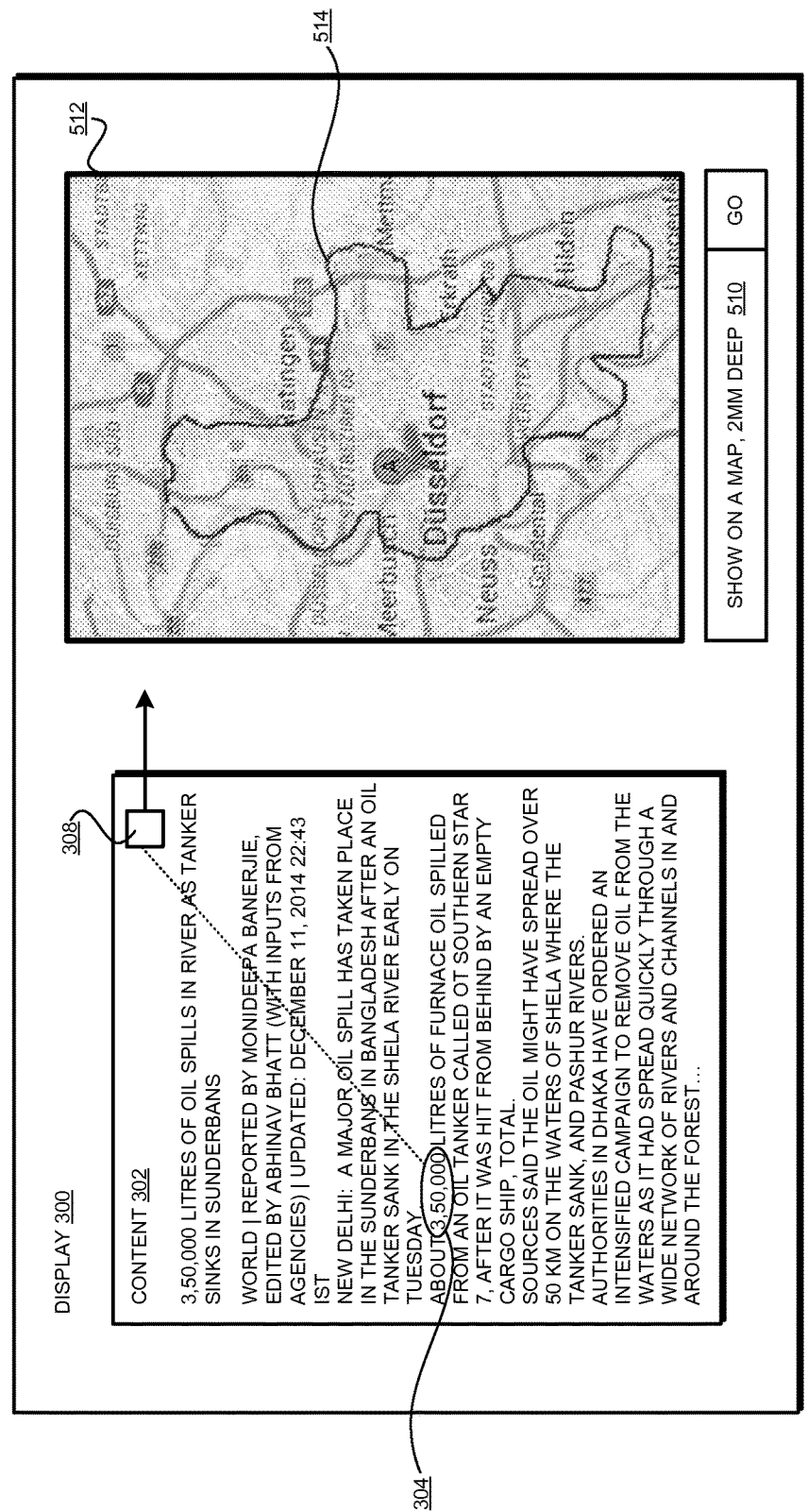
FIG. 5 depicts a block diagram of a changed visualization in accordance with an illustrative embodiment.

With reference to FIG. 5, this figure depicts a block diagram of a changed visualization in accordance with an illustrative embodiment. Display 300, content 302, indication 308, and input method 318 are the same artifacts as 300 in FIG. 3.

Suppose that the user inputs change instruction 510 in input method 318. Instruction 510 reads, "show on a map, 2 mm deep". Component 426 uses NLP engine 407 in FIG. 4 to analyze instruction 510. Component 426 determines that the user wants numerical information 304 visualized as a map area that is covered 2 mm deep by the volume of oil represented by the value of numerical information 304.

Accordingly, component 426 causes component 410 to generate visualization 512. Visualization 512 includes a map, on which area 514 is outlined. Component 410 computes the area within outline 514 to represent the map area that is covered 2 mm deep by the volume of oil represented by the value of numerical information 304. An existing city outline or an existing area outline on the map serves as the comparison object.

This example of changed visualization is not intended to be limiting. From this disclosure, those of ordinary skill in the art will be able to conceive many other instructions 510 and the corresponding changed visualizations, and the same are contemplated within the scope of the illustrative embodiments.

Figure 6:
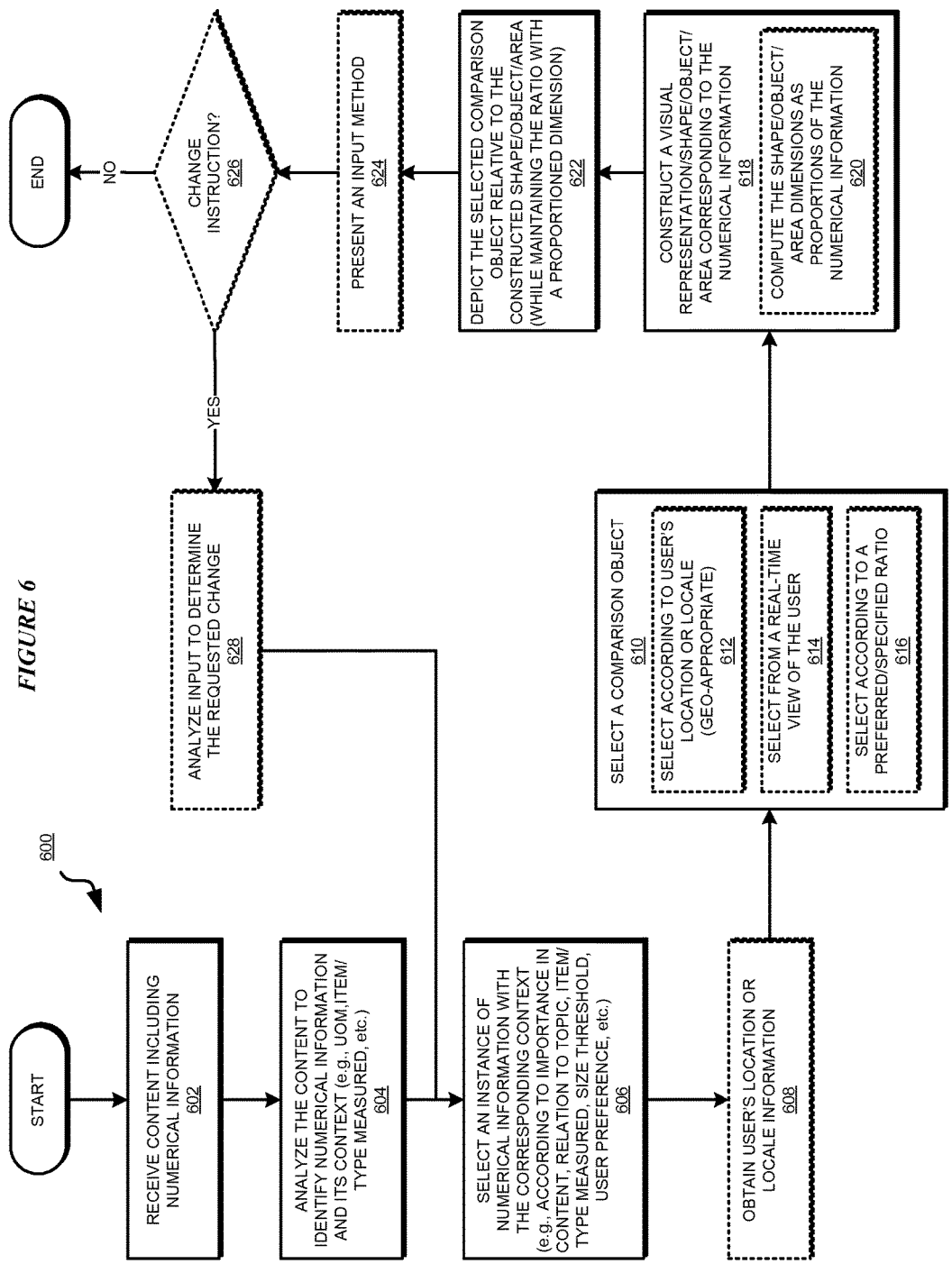
FIG. 6 depicts a flowchart of an example process for comparative visualization of numerical information in accordance with an illustrative embodiment.

With reference to FIG. 6, this figure depicts a flowchart of an example process for comparative visualization of numerical information in accordance with an illustrative embodiment. Process 600 can be implemented in application 402 in FIG. 4.

The application receives content that includes numerical information (block 602). The application analyzes the content to identify the instances of numerical information and their associated contextual information (block 604). Some non-limiting examples of the contextual information include a unit of measure, an item or a type of item that is being measured, and the like.

The application selects an instance of numerical information with the corresponding context (block 606). Some non-limiting examples of selection criteria to use in block 606 include selection according to the numerical information's importance in the content, numerical information's relation to the topic of the content, the item or type of item being measured or described by the numerical information, a size or value represented by the numerical information, whether the size or value represented by the numerical information exceeds a user-specified threshold, a user preference, and the like.

Optionally, the application obtains the user's location or locale information (block 608), otherwise the application proceeds to block 610. The application selects a comparison object (block 610).

The selection at block 610 may select the comparison object according to the user's location or locale, if available from block 608 (block 612). Alternatively, the selection of block 610 may select the comparison object from a real-time view of the user, e.g., if available from a device of the user (block 614). Alternatively, the selection of block 610 may select the comparison object according to a preferred or specified ratio (block 616).

The application constructs a visual representation, to wit, a shape, object, or area, corresponding to the numerical information (block 618). In the construction at block 618, the application computes one or more dimensions of the shape, object, or area, such that the one or more dimensions are proportional to the value represented in the numerical information (block 620).

The application depicts the selected comparison object relative to the constructed shape while maintaining the ratio with the proportioned dimension of the constructed shape (block 622). The application optionally presents an input method (block 624), otherwise the application proceeds to optional block 626, or ends thereafter.

If an input method is presented at block 624, the application determines whether the user has provided a change instruction (block 626). If the user has provided a change instruction ("Yes" block 626), the application analyzes the input or instruction to determine the requested change (block 628). Thereafter, the application returns to block 606 or 610, as the instruction may require. If the user has not provided a change instruction ("No" path of block 626), the application ends process 600 thereafter.

Thus, a computer implemented method, system or apparatus, and computer program product are provided in the illustrative embodiments for comparative visualization of numerical information. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for visualizing numerical information, the method comprising:

analyzing, using a processor and a memory, a content to identify the numerical information;

selecting, from the content, a contextual information that is descriptive of the numerical information using natural language processing (NLP), wherein the contextual information includes a unit of measure of the numerical information;

selecting a graphical shape to represent the numerical information, wherein the graphical shape is selected from one of a geometric shape and a non-geometric shape, selecting a graphical shape comprising:

determining a context of the numerical information; and selecting, responsive to determining a context of the numerical information, a subset of graphical shapes, each graphical shape in the subset of graphical shapes including a parameter usable with the context;

adjusting a dimension of the graphical shape such that the adjusted dimension represents a value in proportion to the numerical information according to a scale, wherein the dimension is an area of the graphical shape;

selecting a comparison object, wherein a size associated with the comparison object is a fraction of the adjusted dimension according to a ratio, and wherein the comparison object and the ratio is selected based upon a set of user preferences, a user preference for the comparison object associated with the user in which the user specifically selects in the user preference between using a physical location associated with a device and a locale preference configured by the user, wherein the locale preference is configured according to a language and geographical settings of a geographical region; and presenting, as a visualization of the numerical information, the comparison object relative to the graphical shape.

2. The method of claim 1, further comprising:
receiving, from an input interface, a change instruction;
changing the visualization of the numerical information according to the change instruction.

3. The method of claim 2, further comprising:
determining, responsive to analyzing the change instruction, that the comparison object has to be changed in the visualization; and
replacing, as a part of the changing, the comparison object with a second comparison object.

4. The method of claim 3, further comprising:
determining, responsive to the analyzing the change instruction, that the ratio has to be changed to a second ratio; and
selecting the second comparison object, wherein a second size associated with the second comparison object is a fraction of the adjusted dimension according to the second ratio.

5. The method of claim 2, further comprising:
determining, responsive to analyzing the change instruction, that the graphical shape has to be changed in the visualization; and
replacing, as a part of the changing, the graphical shape with a second graphical shape.

6. The method of claim 1, further comprising:
overlapping, as a part of the presenting, the comparison object and the graphical shape.

7. The method of claim 1, wherein the comparison object comprises a graphical representation of a physical object, further comprising:
receiving the ratio as a preference input.

8. The method of claim 1, further comprising:
receiving a location of a device;
identifying an object located at the location; and
using a view of the object from the device as the comparison object.

9. The method of claim 1, further comprising:
receiving a locale setting of a device;
identifying an object located in a region of the locale setting; and
using a representation of the object in the region as the comparison object.

10. The method of claim 1, wherein the graphical shape is a non-geometrical shape.

11. The method of claim 1, wherein the graphical shape represents a three-dimensional object.

12. The method of claim 1, wherein the graphical shape represents a non-geometrical object.

13. The method of claim 1, wherein the graphical shape represents a two-dimensional map.

14. The method of claim 1, further comprising:
identifying a unit of measure associated with the numerical information; and
using the unit of measure as the contextual information.

15. The method of claim 1, further comprising:
identifying a type of an item described by the numerical information; and
using the type of the item as the contextual information, wherein the type of the item appears within a specified word distance from the numerical information in the content.

16. The method of claim 1, wherein the numerical information is one of a plurality of numerical information in the content, a second numerical information in the plurality being associated with a second contextual information in the content.

17. The method of claim 1, wherein the method is embodied in a computer program product comprising one or more computer-readable storage devices and computer-readable program instructions which are stored on the one or more computer-readable tangible storage devices and executed by one or more processors.

18. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

19. A computer program product for visualizing numerical information, the computer program product comprising one or more computer-readable storage devices, and program instructions stored on at least one of the one or more storage devices, the stored program instructions comprising:
program instructions to analyze, using a processor and a memory, a content to identify the numerical information;
program instructions to select, from the content, a contextual information that is descriptive of the numerical information using natural language processing (NLP), wherein the contextual information includes a unit of measure of the numerical information;
program instructions to select a graphical shape to represent the numerical information, wherein the graphical shape is selected from one of a geometric shape and a non-geometric shape, program instructions to select a graphical shape comprising:
program instructions to determine a context of the numerical information; and
program instructions to select, responsive to determining a context of the numerical information, a subset of graphical shapes, each graphical shape in the subset of graphical shapes including a parameter usable with the context;
program instructions to adjust a dimension of the graphical shape such that the adjusted dimension represents a value in proportion to the numerical information according to a scale, wherein the dimension is an area of the graphical shape;
program instructions to select a comparison object, wherein a size associated with the comparison object is a fraction of the adjusted dimension according to a ratio, and wherein the comparison object and the ratio is selected based upon a set of user preferences, a user preference for the comparison object associated with the user in which the user specifically selects in the user preference between using a physical location associated with the user and a locale preference configured by the user, wherein the locale preference is configured according to a language and geographical settings of a geographical region; and
program instructions to present, as a visualization of the numerical information, the comparison object relative to the graphical shape.

20. A computer system for visualizing numerical information, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze, using a processor and a memory, a content to identify the numerical information;
program instructions to select, from the content, a contextual information that is descriptive of the numerical information using natural language processing (NLP), wherein the contextual information includes a unit of measure of the numerical information;
program instructions to select a graphical shape to represent the numerical information, wherein the graphical shape is selected from one of a geometric shape and a non-geometric shape, program instructions to select a graphical shape comprising:
program instructions to determine a context of the numerical information; and
program instructions to select, responsive to determining a context of the numerical information, a subset of graphical shapes, each graphical shape in the subset of graphical shapes including a parameter usable with the context;
program instructions to adjust a dimension of the graphical shape such that the adjusted dimension represents a value in proportion to the numerical information according to a scale, wherein the dimension is an area of the graphical shape;
program instructions to select a comparison object, wherein a size associated with the comparison object is a fraction of the adjusted dimension according to a ratio, and wherein the comparison object and the ratio is selected based upon a set of user preferences, a user preference for the comparison object associated with the user in which the user specifically selects in the user preference between using a physical location associated with the user and a locale preference configured by the user, wherein the locale preference is configured according to a language and geographical settings of a geographical region; and
program instructions to present, as a visualization of the numerical information, the comparison object relative to the graphical shape.

* * * * *